(12) United States Patent
Otsuki

(10) Patent No.: US 10,174,185 B2
(45) Date of Patent: Jan. 8, 2019

(54) PNEUMATIC TIRE

(71) Applicant: SUMITOMO RUBBER INDUSTRIES, LTD., Kobe-shi, Hyogo (JP)

(72) Inventor: Hirotoshi Otsuki, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/347,257

(22) Filed: Nov. 9, 2016

(65) Prior Publication Data

US 2017/0158844 A1 Jun. 8, 2017

(30) Foreign Application Priority Data

Dec. 7, 2015 (JP) ................. 2015-238705

(51) Int. Cl.
*C08L 7/00* (2006.01)
*C08K 3/04* (2006.01)
*B60C 1/00* (2006.01)
*C08K 5/01* (2006.01)

(52) U.S. Cl.
CPC .............. *C08L 7/00* (2013.01); *B60C 1/0016* (2013.01); *C08K 3/04* (2013.01); *C08K 5/01* (2013.01); *C08L 2205/03* (2013.01)

(58) Field of Classification Search
CPC ................................ C08K 3/04; B60C 1/0016
See application file for complete search history.

(56) References Cited

U.S. PATENT DOCUMENTS

| | | | | |
|---|---|---|---|---|
| 8,865,803 | B2 * | 10/2014 | Miyazaki | .................. B60C 1/00 152/450 |
| 2014/0155521 | A1 * | 6/2014 | Miyazaki | ................. C08K 3/36 523/156 |

FOREIGN PATENT DOCUMENTS

| | | |
|---|---|---|
| JP | 2006-233177 A | 9/2006 |
| JP | 2008-50570 A | 3/2008 |
| JP | 2008-101127 A | 5/2008 |

* cited by examiner

*Primary Examiner* — Vickey Nerangis
(74) *Attorney, Agent, or Firm* — Birch, Stewart, Kolasch & Birch LLP

(57) ABSTRACT

Provided is a pneumatic tire including a base tread formed from a rubber composition that can highly improve fuel economy, wet grip performance, and abrasion resistance while maintaining the balance between them. The pneumatic tire includes a base tread formed from a rubber composition, the rubber composition containing predetermined amounts of an isoprene rubber, a specified hydrogenated terpene resin, and a specified carbon black.

3 Claims, No Drawings

PNEUMATIC TIRE

TECHNICAL FIELD

The present invention relates to a pneumatic tire including a base tread formed from a rubber composition.

BACKGROUND ART

A recent trend in the field of tires for passenger cars is to place emphasis on fuel economy and wet grip performance for which a labelling system has been introduced. Tires for heavy duty trucks and buses are also increasingly required to meet the same performance demand.

Conventional techniques developed to achieve such required performance include incorporation of a modified styrene-butadiene rubber or a modified polybutadiene rubber into, use of a system containing silica and a silane coupling agent for, or incorporation of a silica having a large specific surface area into, a cap tread which comes into contact with the road surface. For example, the incorporation of silica into a cap tread can reduce rolling resistance and at the same time improve wet traction performance. Additionally, Patent Literatures 1 to 3 each disclose a method for improving fuel economy etc. by incorporating two types of silicas differing in nitrogen adsorption specific surface area or particle size into a tread. However, making improvements solely in a cap tread provides only a limited increase in fuel economy. In an attempt to enable tires to achieve even higher fuel economy, therefore, it has been common practice to introduce a technique for increasing fuel economy not only to a cap tread but also to a base tread located below the cap tread.

In order to enable tires to achieve even higher fuel economy, it is very effective to increase the proportion of the base tread to which a technique for increasing fuel economy has been introduced. However, too high a proportion of such a base tread in the whole tire tread may lead to exposure of the base tread on the tread surface in the final phase of tire wear, causing drastic decrease in abrasion resistance or wet grip performance. In view of these, a rubber composition is desired which is excellent in fuel economy and wet grip performance as well as abrasion resistance. However, it is very difficult to prepare a rubber composition having such physical properties, and a rubber composition for base treads in which fuel economy, wet grip performance, and abrasion resistance are highly improved while maintaining the balance between them has not been obtained yet.

CITATION LIST

Patent Literature

Patent Literature 1: JP 2006-233177 A
Patent Literature 2: JP 2008-50570 A
Patent Literature 3: JP 2008-101127 A

SUMMARY OF INVENTION

Technical Problem

The present invention has been made to solve the above problems and aims to provide a pneumatic tire including a base tread formed from a rubber composition that can highly improve fuel economy, wet grip performance, and abrasion resistance while maintaining the balance between them.

Solution to Problem

The present invention relates to a pneumatic tire, including a base tread formed from a rubber composition, the rubber composition containing: a rubber component including an isoprene rubber; a carbon black; and a hydrogenated terpene resin, the carbon black having a CTAB of 140 to 180 $m^2/g$, the carbon black having a COAN of 110 to 150 ml/100 g, the hydrogenated terpene resin having a softening point of 120 to 130° C., the rubber composition containing 60 mass % or more of the isoprene rubber based on 100 mass % of the rubber component, the rubber composition containing, per 100 parts by mass of the rubber component, 25 to 45 parts by mass of the carbon black and 1 to 15 parts by mass of the hydrogenated terpene resin.

It is preferable for the rubber component to include 15 mass % or more of a polybutadiene rubber having a cis content of 95 mass % or more.

It is preferable for the rubber composition to contain 5 to 30 parts by mass of a silica having a nitrogen adsorption specific surface area of 100 to 200 $m^2/g$ per 100 parts by mass of the rubber component.

Advantageous Effects Of Invention

A pneumatic tire that can be provided by the present invention includes a base tread formed from a rubber composition, the rubber composition containing: a rubber component including an isoprene rubber; a carbon black having a CTAB of 140 to 180 $m^2/g$ and a COAN of 110 to 150 ml/100 g; and a hydrogenated terpene resin having a softening point of 120 to 130° C., the rubber composition containing 60 mass % or more of the isoprene rubber based on 100 mass % of the rubber component, the rubber composition containing, per 100 parts by mass of the rubber component, 25 to 45 parts by mass of the carbon black and 1 to 15 parts by mass of the hydrogenated terpene resin. As such, the pneumatic tire has highly improved fuel economy, wet grip performance, and abrasion resistance while maintaining the balance between them.

DESCRIPTION OF EMBODIMENTS

The pneumatic tire according to the present invention includes a base tread formed from a rubber composition. The rubber composition contains: a rubber component including an isoprene rubber; a carbon black having a CTAB of 140 to 180 $m^2/g$ and a COAN of 110 to 150 ml/100 g; and a hydrogenated terpene resin having a softening point of 120 to 130° C. Further, the rubber composition contains 60 mass % or more of the isoprene rubber based on 100 mass % of the rubber component, and also contains, per 100 parts by mass of the rubber component, 25 to 45 parts by mass of the carbon black and 1 to 15 parts by mass of the hydrogenated terpene resin.

Incorporating predetermined amounts of a specified carbon black and a specified hydrogenated terpene resin into a rubber composition incorporating an isoprene rubber can highly improve fuel economy, wet grip performance, and abrasion resistance while maintaining the balance between them. With a base tread formed from such a rubber composition, it is possible to produce a pneumatic tire in which the deterioration of wet grip performance and abrasion resistance is reduced even when the proportion of the base tread in the whole tire tread is increased leading to exposure of the base tread on the tread surface in the final phase of tire wear, despite the fact that the base tread has high fuel economy.

The incorporation of a carbon black having a CTAB of 140 to 180 m$^2$/g and a COAN of 110 to 150 ml/100 g can provide high fuel economy and high abrasion resistance, in particular. The incorporation of a hydrogenated terpene resin having a softening point of 120 to 130° C. can provide high wet grip performance, in particular. Due to its high adsorptivity, a carbon black having a CTAB of 140 to 180 m$^2$/g and a COAN of 110 to 150 ml/100 g generally tends to adsorb resins and thereby weaken the effects of resins added. However, when the resin used is a hydrogenated terpene resin, the adsorption of the resin by the highly-adsorptive carbon black can be reduced because the resin has been hydrogenated. Thus, only when a carbon black having a CTAB of 140 to 180 m$^2$/g and a COAN of 110 to 150 ml/100 g and a hydrogenated terpene resin having a softening point of 120 to 130° C. are used in combination, the effects of both components added can be achieved at the same time without impairing them. It is therefore possible to highly improve fuel economy, wet grip performance, and abrasion resistance while maintaining the balance between them.

This effect is particularly marked when an isoprene rubber is used as a rubber component.

Furthermore, in general, hydrogenating a resin enhances its thermal stability and increases its shelf life. Thus, when the hydrogenated terpene resin is incorporated into rubber, the progression of pyrolysis and oxidation is reduced, thereby reducing odor.

The rubber composition according to the present invention contains an isoprene rubber as a rubber component. The use of an isoprene rubber as a rubber component provides good fuel economy, good wet grip performance, and good abrasion resistance.

Examples of the isoprene rubber include natural rubber and polyisoprene, which may be modified. Examples of modified natural rubbers include epoxidized natural rubber (ENR), highly purified natural rubber (UPNR), and hydrogenated natural rubber. Thus, in another suitable embodiment of the present invention, the isoprene rubber is at least one selected from the group consisting of natural rubber and polyisoprene.

These isoprene rubbers may be used alone or in combinations of two or more.

The natural rubber is not particularly limited, and examples include those common in the tire industry, such as SIR 20, RSS #3, and TSR 20.

The rubber component may further include an additional rubber other than the isoprene rubber.

The additional rubber used may be one commonly used in the rubber industry, and examples include synthetic rubbers such as: diene rubbers including, e.g., polybutadiene rubber (BR), styrene-butadiene rubber (SBR), styrene-isoprene-butadiene rubber (SIBR), acrylonitrile-butadiene rubber (NBR), and chloroprene rubber (CR); and butyl rubbers including, e.g., halogenated butyl rubber (X-IIR) and butyl rubber (IIR). These synthetic rubbers may be modified (i.e. modified synthetic rubbers). These additional rubbers may be used alone or in combinations of two or more. The additional rubber is preferably polybutadiene rubber because it contributes to good fuel economy, good wet grip performance, and good abrasion resistance. Thus, in another suitable embodiment of the present invention, the rubber component of the rubber composition according to the present invention includes an isoprene rubber and polybutadiene rubber.

The polybutadiene rubber (BR) is not particularly limited, and those common in the tire industry can be used. Examples include: high-cis content polybutadiene rubbers such as BR 1220 manufactured by Zeon Corporation and BR 130B and BR 150B both manufactured by Ube Industries, Ltd.; modified polybutadiene rubbers such as BR 1250H manufactured by Zeon Corporation; polybutadiene rubbers containing syndiotactic polybutadiene crystals such as VCR 412 and VCR 617 both manufactured by Ube Industries, Ltd.; and polybutadiene rubbers synthesized using rare-earth catalysts, such as BUNA-CB25 manufactured by LANXESS. These BRs may be used alone or in combinations of two or more.

The cis content of the BR is preferably 70 mass % or more, more preferably 90 mass % or more, and even more preferably 95 mass % or more.

The cis content (cis-1,4 bond content) of the BR herein can be determined by infrared absorption spectroscopy.

In the present invention, the amount of the isoprene rubber is 60 mass % or more based on 100 mass % of the rubber component including the additional rubber as well. When the amount of the isoprene rubber in the rubber component is within this range, high fuel economy, high wet grip performance, and high abrasion resistance can be obtained. The amount of the isoprene rubber is preferably 65 mass % or more, more preferably 70 mass % or more, and even more preferably 75 mass % or more. The upper limit of the amount is not limited to a particular value. However, in order to achieve the effect of the additional rubber incorporated while maintaining the performance improvement effect of the isoprene rubber, the amount of the isoprene rubber is preferably 95 mass % or less, more preferably 90 mass % or less, and even more preferably 85 mass % or less.

When polybutadiene rubber is incorporated as the additional rubber, the amount of the polybutadiene rubber based on 100 mass % of the rubber component is preferably 5 mass % or more, more preferably 10 mass % or more, and even more preferably 15 mass % or more. Also, the amount is preferably 35 mass % or less, more preferably 30 mass % or less, and even more preferably 25 mass % or less.

Thus, in another suitable embodiment of the present invention, the rubber component in the present invention includes 15 mass % or more of a polybutadiene rubber having a cis content of 95 mass % or more, based on 100 mass % of the rubber component.

The rubber composition according to the present invention contains a carbon black having a CTAB of 140 to 180 m$^2$/g and a COAN of 110 to 150 ml/100 g. The rubber composition containing such a carbon black having specified CTAB and COAN ranges can offer high fuel economy and high abrasion resistance, in particular.

The CTAB (cetyltrimethylammonium bromide adsorption specific surface area) of the carbon black is 140 m$^2$/g or more, preferably 145 m$^2$/g or more, more preferably 150 m$^2$/g or more, and even more preferably 155 m$^2$/g or more. The CTAB is 180 m$^2$/g or less, preferably 175 m$^2$/g or less, more preferably 170 m$^2$/g or less, and even more preferably 165 m$^2$/g or less. If the CTAB is less than 140 m$^2$/g, it is difficult to ensure abrasion resistance, while if the CTAB is more than 180 m$^2$/g, fuel economy deteriorates. In contrast, when the CTAB is within the range indicated above, good fuel economy and good abrasion resistance can be obtained.

The CTAB of the carbon black herein is determined according to ASTM D6556.

The COAN (compressed oil absorption number) of the carbon black is 110 ml/100 g or more, preferably 115 ml/100 g or more, more preferably 120 ml/100 g or more, and even more preferably 125 ml/100 g or more. The COAN is 150 ml/100 g or less, preferably 145 ml/100 g or less, more preferably 140 ml/100 g or less, and even more preferably 135 ml/100 g or less. If the COAN is less than 110 ml/100 g, fuel economy deteriorates, while if the COAN is more than 150 ml/100 g, resistance to external damage caused by driving decreases. In contrast, when the COAN is within the range indicated above, good fuel economy and good abrasion resistance can be obtained.

The COAN of the carbon black herein is determined according to ASTM D3493. The oil used is dibutyl phthalate (DBP).

The carbon black having a CTAB of 140 to 180 $m^2/g$ and a COAN of 110 to 150 ml/100 g can be produced using a swirl flow carbon black production furnace. In particular, the CTAB can be controlled depending on the burning temperature, while the COAN can be controlled depending on the degree of turbulence.

The amount of the carbon black is 25 to 45 parts by mass per 100 parts by mass of the rubber component. If the amount is less than 25 parts by mass, abrasion resistance decreases, while if the amount is more than 45 parts by mass, fuel economy deteriorates. In contrast, when the amount is within the range indicated above, good fuel economy and good abrasion resistance can be obtained. The amount of the carbon black per 100 parts by mass of the rubber component is preferably 30 parts by mass or more and more preferably 35 parts by mass or more. The amount is also preferably 40 parts by mass or less.

The rubber composition according to the present invention contains a hydrogenated terpene resin having a softening point of 120 to 130° C. The rubber composition containing such a specified hydrogenated terpene resin can offer high wet grip performance, in particular.

The hydrogenated terpene resin may be for example one obtained by hydrogenation of a terpene resin such as polyterpene or terpene aromatic resin. It is preferably a hydrogenated terpene aromatic resin obtained by hydrogenation of a terpene aromatic resin, among others, because then the effect of the present invention can be more suitably achieved. Such hydrogenated terpene resins may be used alone or in combinations of two or more.

The polyterpene refers to a resin obtained by polymerization of a terpene compound, and the terpene compounds include hydrocarbons represented by the compositional formula $(C_5H_8)_n$ and their oxygen-containing derivatives, which contain as a backbone any of terpenes classified into monoterpenes $(C_{10}H_{16})$, sesquiterpenes $(C_{15}H_{24})$ diterpenes $(C_{20}H_{32})$, and others.

Specific examples of the terpene compound include α-pinene, β-pinene, 3-carene (δ-3-carene), dipentene, limonene, myrcene, allo-ocimene, ocimene, α-phellandrene, α-terpinene, γ-terpinene, terpinolene, 1,8-cineole, 1,4-cineole, α-terpineol, β-terpineol, and γ-terpineol. These terpene compounds may be used alone or in combinations of two or more.

Specific examples of the polyterpene include YS RESIN PX1250 (manufactured by YASUHARA CHEMICAL CO., LTD.).

The term "terpene aromatic resin" as used in the hydrogenated terpene aromatic resin refers to a compound obtained by copolymerizing an aromatic compound and a terpene compound by a commonly used method. Specifically, for example, the terpene aromatic resin can be produced by adding dropwise the starting materials to an organic solvent such as toluene in the presence of a catalyst such as $BF_3$ in any order and reacting them at a predetermined temperature for a predetermined time.

The copolymerization ratio between the aromatic compound and the terpene compound can be selected appropriately so that the resulting hydrogenated terpene aromatic resin has the physical properties as described later. Moreover, the terpene aromatic resin may contain a comonomer unit other than the aromatic compound and the terpene compound, such as indene, as long as the hydrogenated terpene aromatic resin obtained has the physical properties as described later.

The aromatic compound may be any compound containing an aromatic ring. Examples include: phenol compounds such as phenol, alkylphenols, alkoxyphenols, and unsaturated hydrocarbon group-containing phenols; naphthol compounds such as naphthol, alkylnaphthols, alkoxynaphthols, and unsaturated hydrocarbon group-containing naphthols; and styrene derivatives such as styrene, alkylstyrenes, alkoxystyrenes, and unsaturated hydrocarbon group-containing styrenes. Among these, styrene derivatives are preferred. The number of carbon atoms in the alkyl or alkoxy group of the above compounds is preferably 1 to 20 and more preferably 1 to 12. Also, the number of carbon atoms in the unsaturated hydrocarbon group of the above compounds is preferably 2 to 20 and more preferably 2 to 12.

The aromatic compound may have one substituent or two or more substituents on the aromatic ring. When two or more substituents are present on the aromatic ring, these substituents may be located in any of the ortho, meta, and para positions. Furthermore, in the case of a styrene derivative having a substituent on the aromatic ring, the substituent may be in an ortho, meta or para position relative to the vinyl group derived from styrene.

These aromatic compounds may be used alone or in combinations of two or more.

Specific examples of the alkylphenols include methylphenol, ethylphenol, butylphenol, t-butylphenol, octylphenol, nonylphenol, decylphenol, and dinonylphenol.

Their substituents may be in the ortho, meta or para position. Among these, t-butylphenol is preferred, with p-t-butylphenol being more preferred.

Specific examples of the alkylnaphthols include compounds obtained by replacing the phenol moiety of the aforementioned alkylphenols by naphthol.

Specific examples of the alkylstyrenes include compounds obtained by replacing the phenol moiety of the aforementioned alkylphenols by styrene.

Specific examples of the alkoxyphenols include compounds obtained by replacing the alkyl groups of the aforementioned alkylphenols by the corresponding alkoxy groups. Also, specific examples of the alkoxynaphthols include compounds obtained by replacing the alkyl groups of the aforementioned alkylnaphthols by the corresponding alkoxy groups. Furthermore, specific examples of the alkoxystyrenes include compounds obtained by replacing the alkyl groups of the aforementioned alkylstyrenes by the corresponding alkoxy groups.

Examples of the unsaturated hydrocarbon group-containing phenols include compounds which contain at least one hydroxyphenyl group per molecule and in which at least one hydrogen atom on the phenyl moiety is substituted by an unsaturated hydrocarbon group. The unsaturated bond in the unsaturated hydrocarbon group may be a double bond or a triple bond.

Examples of the unsaturated hydrocarbon group include alkenyl groups having 2 to 20 carbon atoms.

Specific examples of the unsaturated hydrocarbon group-containing phenols include isopropenylphenol and butenylphenol. The unsaturated hydrocarbon group-containing naphthols and the unsaturated hydrocarbon group-containing styrenes are as described above.

The terpene compounds include hydrocarbons represented by the compositional formula $(C_5H_8)_n$ and their oxygen-containing derivatives, which contain as a backbone any of terpenes classified into monoterpenes ($C_{10}H_{16}$), sesquiterpenes ($C_{15}H_{24}$), diterpenes ($C_{20}H_{32}$), and others. Although the terpene compound is not particularly limited, it is preferably an unsaturated cyclic hydrocarbon and is also preferably a compound having no hydroxyl group.

Specific examples of the terpene compound include α-pinene, β-pinene, 3-carene (δ-3-carene), dipentene, limonene, myrcene, allo-ocimene, ocimene, α-phellandrene, α-terpinene, γ-terpinene, terpinolene, 1,8-cineole, 1,4-cineole, α-terpineol, β-terpineol, and γ-terpineol. Among these, α-pinene, β-pinene, 3-carene (δ-3-carene), dipentene, and limonene are preferred, with α-pinene or limonene being more preferred, because they allow for a balanced improvement in wet grip performance, fuel economy, and abrasion resistance. The limonene includes d-limonene, l-limonene, and dl-limonene.

These terpene compounds may be used alone or in combinations of two or more.

The terpene aromatic resin produced for example by copolymerization of a styrene derivative and limonene may be a compound represented by the following formula (I).

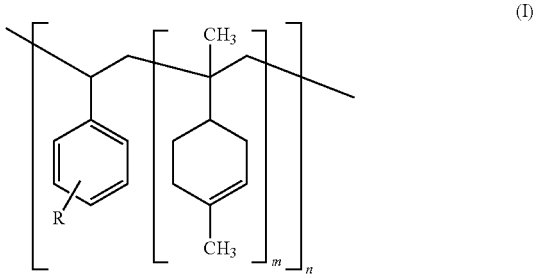

(I)

In formula (I), R represents a substituent on the aromatic ring and is an alkyl group having 1 to 20 carbon atoms, an alkoxy group having 1 to 20 carbon atoms, or an unsaturated hydrocarbon group having 2 to 20 carbon atoms, the number of substituents R may be 1 to 5, and when the number of substituents is 2 or more, the substituents may be the same as or different from each other and may also be located in any position; m is 0.2 to 20; and n is 2 to 10.

Specific examples of the terpene aromatic resin include YS RESIN TO125 (manufactured by YASUHARA CHEMICAL CO., LTD.).

The hydrogenated terpene resin in the present invention can be produced by hydrogenating the double bonds of the terpene resin described above by a commonly used method. The hydrogenation may be accomplished, for example, by catalytic hydrogen reduction using as a catalyst a noble metal such as palladium, ruthenium, rhodium, or nickel, either alone or supported on a carrier such as activated carbon, activated alumina, or diatomite.

The amount of the catalyst to be used is preferably 0.1 to 50 mass %, and more preferably 0.2 to 40 mass % per 100 mass % of the starting terpene resin. If the amount of the catalyst is less than 0.1 mass %, the hydrogenation reaction tends to slow down, while if the amount is more than 50 mass %, the catalyst may be left as an impurity which can act as an obstacle to filler dispersion or polymer dispersion, resulting in a failure to achieve sufficient tensile strength or wet grip performance. The hydrogen pressure in the hydrogenation reaction is typically 5 to 200 kg/cm², and preferably 50 to 100 kg/cm². If the hydrogen pressure is less than 5 kg/cm², the reaction rate of the hydrogenation reaction tends to slow down, while if the hydrogen pressure is more than 200 kg/cm², the reaction equipment may be damaged or become difficult to maintain, resulting in poor productivity. Moreover, the reaction temperature in the hydrogenation reaction is typically 10 to 200° C., and preferably 20 to 150° C. If the reaction temperature is less than 10° C., the hydrogenation reaction tends to slow down, while if the reaction temperature is more than 200° C., the reaction equipment may be damaged or become difficult to maintain, resulting in poor productivity.

The hydrogenated polyterpene used may be a commercially available product, such as CLEARON P125 (manufactured by YASUHARA CHEMICAL CO., LTD.).

The hydrogenated terpene aromatic resin used may be a commercially available product, such as YS POLYSTER M125 (manufactured by YASUHARA CHEMICAL CO., LTD.).

The hydrogenated terpene resin of the present invention prepared as above contains hydrogenated double bonds. Particularly in the case of a hydrogenated terpene aromatic resin, it is preferably one obtained by selectively hydrogenating the double bonds other than those of the aromatic ring of a terpene aromatic resin.

In the hydrogenated terpene resin, the percentage of hydrogenated double bonds is preferably 1 to 100%. Particularly in the case of a hydrogenated polyterpene, the percentage of hydrogenated double bonds is preferably 20 to 100%, more preferably 50% or more, and even more preferably 70% or more. If the percentage is less than 20%, wet grip performance tends to be insufficient. In the case of a hydrogenated terpene aromatic resin, on the other hand, the percentage of hydrogenated double bonds is preferably 1 to 100%, more preferably 5% or more, and even more preferably 7% or more. The percentage is also preferably 80% or less, more preferably 60% or less, even more preferably 40% or less, still even more preferably 30% or less, and particularly preferably 25% or less. If the percentage is less than 1%, wet grip performance tends to be insufficient.

The percentage of hydrogenated double bonds (degree of hydrogenation) is calculated from the integrals of the double bond peaks determined by ¹H-NMR (proton NMR) according to the equation below. The degree of hydrogenation herein refers to the percentage of hydrogenated double bonds.

(Degree of hydrogenation [%])={$(A-B)/A$}×100 where A: the integral of the double bond peaks before hydrogenation;

B: the integral of the double bond peaks after hydrogenation.

For example, when the terpene aromatic resin used is a compound of formula (I) obtained by copolymerization of a styrene derivative and limonene and the degree of hydrogenation is set to 100%, a hydrogenated terpene aromatic resin represented by the formula (II) below can then be obtained. On the other hand, when the degree of hydrogenation is at least 1% but less than 100%, for example, a hydrogenated terpene aromatic resin represented by the formula (III) below can then be obtained.

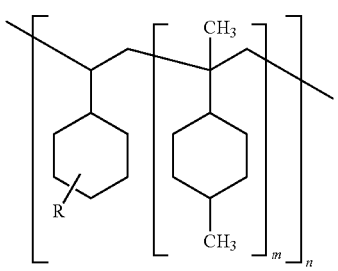
(II)

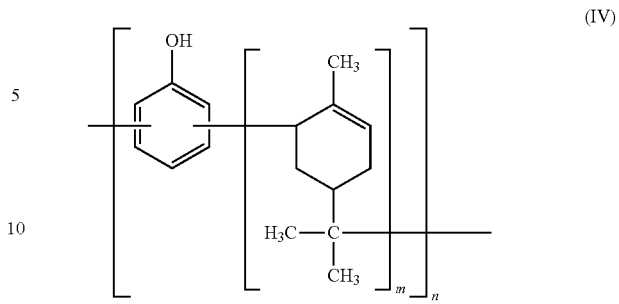
(IV)

In formula (II), R represents a substituent on the cyclohexane ring and is an alkyl group having 1 to 20 carbon atoms, an alkoxy group having 1 to 20 carbon atoms, or an unsaturated hydrocarbon group having 2 to 20 carbon atoms, the number of substituents R may be 1 to 5, and when the number of substituents is 2 or more, the substituents may be the same as or different from each other and may also be located in any position; m is 0.2 to 20; and n is 2 to 10.

In formula (IV), m and n each represent the number of repeating units.

The hydroxyl value of the hydrogenated terpene aromatic resin (i.e., corresponding to the phenol group content) is preferably 20 mgKOH/g or less, more preferably 10 mgKOH/g or less, even more preferably 5 mgKOH/g or less, still even more preferably 1 mgKOH/g or less, and particularly preferably 0.1 mgKOH/g or less. Especially preferably, it is 0 mgKOH/g. If the hydroxyl value is more than 20 mgKOH/g, the resin may show higher self-aggregation tendency and thus lower affinity for rubber and filler, resulting in to a failure to achieve sufficient wet grip performance.

The hydroxyl value of the hydrogenated terpene aromatic resin refers to the amount of potassium hydroxide in milligrams required to neutralize the acetic acid which combines with hydroxyl groups on acetylation of 1 g of the hydrogenated terpene-aromatic resin, and is measured by potentiometric titration (JIS K 0070:1992).

The softening point of the hydrogenated terpene resin is 120 to 130° C., and preferably 123 to 127° C.

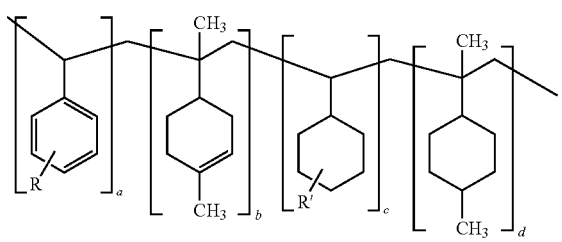
(III)

In formula (III), R represents a substituent on the aromatic ring and is an alkyl group having 1 to 20 carbon atoms, an alkoxy group having 1 to 20 carbon atoms, or an unsaturated hydrocarbon group having 2 to 20 carbon atoms, while R' represents a substituent on the cyclohexane ring and is an alkyl group having 1 to 20 carbon atoms, an alkoxy group having 1 to 20 carbon atoms, or an unsaturated hydrocarbon group having 2 to 20 carbon atoms, the number of substituents R or R' may be 1 to 5, and when the number of substituents is 2 or more, the substituents may be the same as or different from each other and may also be located in any position; and a, b, c, and d each represent the number of repeating units, and the order in which the repeating units are linked is not particularly limited and the repeating units may be arranged in blocks, in an alternating manner, or randomly.

A preferred embodiment of the hydrogenated terpene aromatic resin can be described as, for example, a resin containing a repeating unit of formula (II) containing a cyclohexyl group, provided that the resin may contain in its structure at least one repeating unit selected from the group consisting of a repeating unit of formula (I) and a repeating unit represented by the formula (IV) below. The order in which the repeating units are linked is not particularly limited, and the repeating units may be arranged in blocks, in an alternating manner, or randomly.

The softening point of the hydrogenated terpene resin herein refers to a temperature at which a ball falls when the softening point as defined in JIS K 6220-1:2001 is measured by a ring and ball softening point apparatus.

The glass transition temperature (Tg) of the hydrogenated terpene resin is preferably 20° C. or higher, more preferably 30° C. or higher, and even more preferably 40° C. or higher. The Tg is preferably 100° C. or lower, more preferably 90° C. or lower, and even more preferably 80° C. or lower.

The glass transition temperature of the hydrogenated terpene resin herein is determined by differential scanning calorimetry (DSC) at a temperature increase rate of 10° C./min according to JIS K 7121.

The weight average molecular weight (Mw) of the hydrogenated terpene resin is not particularly limited, but is preferably 300 to 3000, more preferably 500 to 2000, and even more preferably 600 to 2000. If the Mw is less than 300, the G' value (hardness) of the adhesive layer tends to be low, resulting in a failure to achieve sufficient wet grip performance, while if the Mw is more than 3000, rubber hardness tends to become high, resulting in a failure to achieve sufficient wet grip performance or abrasion resistance.

The weight average molecular weight of the hydrogenated terpene resin herein can be determined by gel permeation chromatography (GPC) (using GPC-8000 series manufactured by Tosoh Corporation, a differential refractometer as a detector, and TSKGEL SUPERMULTIPORE HZ-M manufactured by Tosoh Corporation as a column) calibrated with polystyrene standards.

The rubber composition according to the present invention contains 1 to 15 parts by mass of the hydrogenated terpene resin per 100 parts by mass of the rubber component.

The amount of the hydrogenated terpene resin is preferably 2 parts by mass or more, more preferably 3 parts by mass or more, and even more preferably 5 parts by mass or more. The amount is also preferably 13 parts by mass or less and more preferably 11 parts by mass or less. The amount less than 1 part by mass tends not to lead to sufficient wet grip performance, while the amount more than 15 parts by mass tends to lead to decrease in abrasion resistance and deterioration of fuel economy.

The rubber composition according to the present invention may contain silica. The rubber composition containing silica can further improve fuel economy while enhancing wet grip performance and reinforcing properties. Examples of the silica include wet-process silica and dry-process silica.

The nitrogen adsorption specific surface area ($N_2SA$) of the silica is preferably 100 $m^2/g$ or more, more preferably 120 $m^2/g$ or more, and even more preferably 150 $m^2/g$ or more. The $N_2SA$ is also preferably 200 $m^2/g$ or less, more preferably 195 $m^2/g$ or less, and even more preferably 190 $m^2/g$ or less.

The $N_2SA$ of the silica is determined by the BET method according to ASTM D3037-93.

The amount of the silica is preferably 5 to 30 parts by mass per 100 parts by mass of the rubber component. The amount is more preferably 7 parts by mass or more, even more preferably 10 parts by mass or more, and particularly preferably 12 parts by mass or more. The amount less than 5 parts by mass may not lead to sufficient reinforcement. The amount is also more preferably 25 parts by mass or less, even more preferably 20 parts by mass or less, and particularly preferably 17 parts by mass or less. The amount more than 30 parts by mass tends to reduce the dispersibility of the silica, resulting in deterioration of abrasion resistance or fuel economy.

Thus, in another suitable embodiment of the present invention, the rubber composition according to the present invention contains 5 to 30 parts by mass of a silica having a nitrogen adsorption specific surface area of 100 to 200 $m^2/g$ per 100 parts by mass of the rubber component.

When the rubber composition according to the present invention contains silica, it is preferable for the rubber composition to further contain a silane coupling agent. The silane coupling agent used may be any silane coupling agent conventionally combined with silica in the rubber industry.

In view of wet grip performance, etc., the rubber composition according to the present invention may further incorporate a softener. The softener is not particularly limited, and examples include oil, liquid diene polymers, and resins having a softening point of 160° C. or lower. The softener is preferably oil or a liquid diene polymer, among others. In view of wet grip performance, a resin having a softening point of 160° C. or lower may further be incorporated.

Examples of the oil include process oils such as paraffinic, aromatic, and naphthenic process oils.

The liquid diene polymer refers to a diene polymer that is liquid at normal temperature (25° C.)

The polystyrene-equivalent weight average molecular weight (Mw) of the liquid diene polymer as measured by gel permeation chromatography (GPC) is preferably $1.0 \times 10^3$ to $2.0 \times 10^5$, and more preferably $3.0 \times 10^3$ to $1.5 \times 10^4$. If the Mw is less than $1.0 \times 10^3$, the liquid diene polymer may not produce the effect of improving wet grip performance, resulting in a failure to ensure sufficient abrasion resistance, while if the Mw is more than $2.0 \times 10^5$, the polymerization solution may have too high a viscosity, resulting in deterioration of productivity or decrease in tensile properties.

The Mw of the liquid diene polymer herein is determined by gel permeation chromatography (GPC) calibrated with polystyrene standards.

Examples of the liquid diene polymer include liquid styrene-butadiene copolymer (liquid SBR), liquid butadiene polymer (liquid BR), liquid isoprene polymer (liquid IR), and liquid styrene-isoprene copolymer (liquid SIR).

Examples of the resin having a softening point of 160° C. or lower include coumarone-indene resins, α-methylstyrene resins, terpene resins, and p-t-butylphenol acetylene resins.

The softening point of the resin herein can be determined as described for the softening point of the hydrogenated terpene resin.

When a softener is incorporated, the amount of the softener per 100 parts by mass of the rubber component is preferably 5 parts by mass or less, and is more preferably 0.1 to 3 parts by mass, and even more preferably 0.5 to 2 parts by mass. If the amount is more than 5 parts by mass, fuel economy may deteriorate.

In addition to the components described above, the rubber composition according to the present invention may incorporate appropriate compounding ingredients commonly used in the tire industry, including, for example, wax, zinc oxide, stearic acid, antioxidants, vulcanizing agents such as sulfur, vulcanization accelerators, and other materials.

The rubber composition according to the present invention can be prepared by conventionally known methods.

The rubber composition may be prepared, for example, by first compounding (adding) and kneading the components other than sulfur and vulcanization accelerators in a rubber kneading machine such as a Banbury mixer or open roll mill (base kneading step), and then compounding (adding) and kneading sulfur and a vulcanization accelerator into the kneaded mixture, followed by vulcanization.

The base kneading step may be any step that allows the rubber component and others to be kneaded. The base kneading step may be performed in one step or in two separate steps in which the rubber component and some components such as the hydrogenated terpene resin are kneaded in advance, and then the kneaded mixture and other components except sulfur and vulcanization accelerators are kneaded.

The rubber composition is for use in base treads of pneumatic tires. The base tread refers to an inner layer of a multilayer tread. When the tread consists of two layers (outer surface layer (cap tread) and inner surface layer (base tread)), the base tread corresponds to the inner surface layer. Specifically, the base tread is a component as shown in, for example, FIG. 1 of JP 2008-285628 A or FIG. 1 of JP 2008-303360 A, both of which are hereby incorporated by reference in their entirety.

The pneumatic tire according to the present invention includes a base tread formed from the above-described rubber composition according to the present invention.

The pneumatic tire according to the present invention can be produced by common methods using the rubber composition.

Specifically, the tire may be produced by extruding the unvulcanized rubber composition of the present invention into the shape of a base tread, forming the extrudate in a usual manner on a tire building machine, and assembling the product with other tire components to build an unvulcanized tire (green tire), followed by heating and pressing in a vulcanizer.

Thus, another aspect of the present invention is a method for producing a pneumatic tire, the method including: a green tire building step of forming the rubber composition of the present invention into the shape of a base tread and then building a green tire; and a vulcanization step of vulcanizing the green tire.

The pneumatic tire according to the present invention is suitable for passenger cars, large passenger cars, large SUVs, heavy duty vehicles such as trucks and buses, and light trucks, and particularly preferably for passenger cars, and can be used as a summer tire or studless winter tire for these vehicles.

Examples

The present invention will be specifically described with reference to examples. The present invention is not limited only to these examples.

The chemicals used in examples and comparative examples are listed below.

TSR 20: Natural rubber (TSR 20)
BR 150B: Polybutadiene rubber BR 150B manufactured by Ube Industries, Ltd. (cis content: 97 mass %)
Carbon black N220: SHOWBLACK N220 manufactured by Cabot Japan K.K. (CTAB: 115 $m^2$/g, COAN: 105 ml/100 g)
Carbon black trial product A: Carbon black trial product manufactured by Mitsubishi Chemical Corporation (sample name "UX", CTAB: 160 $m^2$/g, COAN: 130 ml/100 g)
Carbon black trial product B: Carbon black trial product manufactured by Mitsubishi Chemical Corporation (sample name "RUN", CTAB: 185 $m^2$/g, COAN: 140 ml/100 g)
Silica VN3: ULTRASIL VN3 manufactured by Evonik ($N_2$SA: 175 $m^2$/g)
Silane coupling agent Si266: Silane coupling agent Si266 manufactured by Evonik (bis(3-triethoxysilylpropyl) disulfide)
Resin A: SYLVARES SA85 manufactured by Arizona Chemical (α-methylstyrene resin (copolymer of α-methylstyrene and styrene), softening point: 85° C., Tg: 43° C., hydroxyl value: 0 mgKOH/g)
Resin B: Sylvares TP115 manufactured by Arizona Chemical (terpene phenol resin, softening point: 115° C., Tg: 55° C., hydroxyl value: 50 mgKOH/g)
Resin C: YS POLYSTER M125 manufactured by YASUHARA CHEMICAL CO., LTD. (hydrogenated terpene aromatic resin, degree of hydrogenation: 11%, softening point: 125° C., Tg: 69° C., hydroxyl value: 0 mgKOH/g)
Resin D: CLEARON M115 manufactured by YASUHARA CHEMICAL CO., LTD. (hydrogenated terpene aromatic resin, softening point: 115° C., Tg: 59° C., hydroxyl value: 0 mgKOH/g)
Resin E: CLEARON P135 manufactured by YASUHARA CHEMICAL CO., LTD. (hydrogenated polyterpene, softening point: 135° C., hydroxyl value: 0 mgKOH/g)
Zinc oxide: zinc oxide #2 manufactured by MITSUI MINING & SMELTING CO., LTD.
Stearic acid: "Tsubaki", stearic acid manufactured by NOF CORPORATION
Sulfur: Seimi Sulfur manufactured by NIPPON KANRYU INDUSTRY CO., LTD (oil content: 10 mass %)
Vulcanization accelerator TBBS: NOCCELER NS manufactured by OUCHI SHINKO CHEMICAL INDUSTRIAL CO., LTD. (N-tert-butyl-2-benzothiazole sulfenamide)

Examples and Comparative Examples

According to the compounding formulations shown in Table 1, the compounding materials other than the sulfur and vulcanization accelerator were mixed using a small Banbury mixer (1.7 L, manufactured by Kobe Steel, Ltd.) at a mixer fill factor of 70% and a rotational speed of 100 rpm until a temperature of 150° C. was reached, followed by discharging the kneaded mixture from the mixer. The resulting kneaded mixture was cooled and formed into a sheet, which was then introduced together with the sulfur and vulcanization accelerator into the mixer again, and mixed at a mixer fill factor of 70% and a rotational speed of 50 rpm until a temperature of 100° C. was reached, followed by discharging the kneaded mixture from the mixer. The unvulcanized rubber composition thus obtained was cooled and formed into a sheet with a thickness of 2 mm or 5 mm, which was then vulcanized at 150° C. for 30 minutes to obtain a 2 mm or 5 mm thick vulcanized sheet.

The vulcanized sheets prepared as above were subjected to the following evaluations. The evaluation results are shown in Table 1.

(Tire Heat Build-Up Properties and Tire Wet Properties)

A viscoelastic analysis sample with a width of 4 mm and a length of 40 mm was taken from each of the 2 mm thick vulcanized sheets, and the loss tangents (tan δ) at 70° C. and 0° C. of the samples were measured using a viscoelasticity spectrometer VES (manufactured by Iwamoto Seisakusyo) at a half-amplitude strain of 1% and a frequency of 10 Hz and expressed as an index (tire heat build-up property index and tire wet property index) using the equation below. The higher the tire heat build-up property index is, the less the amount of heat build-up is, and the better the tire durability and fuel economy are. The higher the tire wet property index is, the better the tire wet grip performance is. When the indices are 97 or more, the performance can be considered at least comparable to that of Comparative Example 1, while the indices are less than 97, the performance can be considered lower than that of Comparative Example 1.

(Tire heat build-up property index)=(tan δ at 70° C. measured for Comparative Example 1)/(tan δ at 70° C. measured for each formulation example)×100.

(Tire wet property index)=(tan δ at 0° C. measured for each formulation example)/(tan δ at 0° C. measured for Comparative Example 1)×100

(Tire Life Properties)

A Lambourn abrasion test sample with a diameter of 40 mm was taken from each of the 5 mm thick vulcanized sheets. The sample of Comparative Example 1 was subjected to a Lambourn abrasion test using a Lambourn abrasion tester (manufactured by Iwamoto Seisakusyo) at a surface rotational speed of 50 m/min, an applied load of 3.0 kg, a flow of falling sand of 15 g/min, a slip ratio of 40%, and a temperature of 25° C. The time taken for the abrasion loss of the sample of Comparative Example 1 to reach 0.1 g or more was set as the testing time, and the samples of the other formulation examples were abraded under the same testing conditions to measure the Lambourn abrasion loss. Then, the abrasion volume was calculated and expressed as an index (tire life property index) using the equation below. The higher the tire life property index is, the less the abrasion volume is, and the better the tire abrasion resistance (life properties) is. When the index is 97 or more, the performance can be considered at least comparable to that of Comparative Example 1, while when the index is less than 97, the performance can be considered lower than that of Comparative Example 1.

(Tire life property index)=(Abrasion volume calculated for Comparative Example 1)/(Abrasion volume calculated for each formulation example)×100

TABLE 1

|  |  | Comparative Example 1 | Comparative Example 2 | Comparative Example 3 | Comparative Example 4 | Comparative Example 5 | Comparative Example 6 | Example 1 | Comparative Example 7 | Comparative Example 8 | Comparative Example 9 |
|---|---|---|---|---|---|---|---|---|---|---|---|
| Compounding amount (parts by mass) | TSR20 | 80 | 80 | 80 | 80 | 80 | 80 | 80 | 80 | 80 | 80 |
|  | BR150B | 20 | 20 | 20 | 20 | 20 | 20 | 20 | 20 | 20 | 20 |
|  | Carbon black N220 | 40 | 40 | 40 | 40 | — | — | — | — | — | — |
|  | Carbon black trial product A | — | — | — | — | 40 | 40 | 40 | — | — | — |
|  | Carbon black trial product B | — | — | — | — | — | — | — | 40 | 40 | 40 |
|  | Silica VN3 | 15 | 15 | 15 | 15 | 15 | 15 | 15 | 15 | 15 | 15 |
|  | Silane coupling agent Si266 | 1.5 | 1.5 | 1.5 | 1.5 | 1.5 | 1.5 | 1.5 | 1.5 | 1.5 | 1.5 |
|  | Resin A | — | 10 | — | — | 10 | — | — | 10 | — | — |
|  | Resin B | — | — | 10 | — | — | 10 | — | — | 10 | — |
|  | Resin C | — | — | — | 10 | — | — | 10 | — | — | 10 |
|  | Resin D | — | — | — | — | — | — | — | — | — | — |
|  | Resin E | — | — | — | — | — | — | — | — | — | — |
|  | Zinc oxide | 3 | 3 | 3 | 3 | 3 | 3 | 3 | 3 | 3 | 3 |
|  | Stearic acid | 2 | 2 | 2 | 2 | 2 | 2 | 2 | 2 | 2 | 2 |
|  | Sulfur | 2 | 2 | 2 | 2 | 2 | 2 | 2 | 2 | 2 | 2 |
|  | Vulcanization accelerator TBBS | 1 | 1 | 1 | 1 | 1 | 1 | 1 | 1 | 1 | 1 |
| Evaluation results | Tire heat build-up property index | 100 | 85 | 88 | 96 | 90 | 95 | 100 | 85 | 88 | 90 |
|  | Tire life property index | 100 | 85 | 90 | 99 | 95 | 100 | 110 | 113 | 115 | 120 |
|  | Tire wet property index | 100 | 104 | 105 | 112 | 105 | 106 | 112 | 105 | 106 | 109 |

|  |  | Comparative Example 10 | Comparative Example 11 | Example 2 | Example 3 | Example 4 | Example 5 | Example 6 | Example 7 |
|---|---|---|---|---|---|---|---|---|---|
| Compounding amount (parts by mass) | TSR20 | 80 | 80 | 60 | 85 | 80 | 80 | 80 | 80 |
|  | BR150B | 20 | 20 | 40 | 15 | 20 | 20 | 20 | 20 |
|  | Carbon black N220 | — | — | — | — | — | — | — | — |
|  | Carbon black trial product A | 40 | 40 | 40 | 40 | 25 | 45 | 40 | 40 |
|  | Carbon black trial product B | — | — | — | — | — | — | — | — |
|  | Silica VN3 | 15 | 15 | 15 | 15 | 15 | 15 | 15 | 15 |
|  | Silane coupling agent Si266 | 1.5 | 1.5 | 1.5 | 1.5 | 1.5 | 1.5 | 1.5 | 1.5 |
|  | Resin A | — | — | — | — | — | — | — | — |
|  | Resin B | — | — | — | — | — | — | — | — |
|  | Resin C | — | — | 10 | 10 | 10 | 10 | 1 | 15 |
|  | Resin D | 10 | — | — | — | — | — | — | — |
|  | Resin E | — | 10 | — | — | — | — | — | — |
|  | Zinc oxide | 3 | 3 | 3 | 3 | 3 | 3 | 3 | 3 |
|  | Stearic acid | 2 | 2 | 2 | 2 | 2 | 2 | 2 | 2 |
|  | Sulfur | 2 | 2 | 2 | 2 | 2 | 2 | 2 | 2 |
|  | Vulcanization accelerator TBBS | 1 | 1 | 1 | 1 | 1 | 1 | 1 | 1 |
| Evaluation results | Tire heat build-up property index | 93 | 95 | 97 | 105 | 120 | 97 | 100 | 97 |
|  | Tire life property index | 95 | 100 | 115 | 108 | 98 | 120 | 105 | 112 |

TABLE 1-continued

|  |  |  |  |  |  |  |  |  |
|---|---|---|---|---|---|---|---|---|
| Tire wet property index | 110 | 105 | 110 | 115 | 110 | 115 | 110 | 115 |

Table 1 demonstrates that in the examples where predetermined amounts of an isoprene rubber, a carbon black having a CTAB of 140 to 180 m$^2$/g and a COAN of 110 to 150 ml/100 g, and a hydrogenated terpene resin having a softening point of 120 to 130° C. were incorporated, the fuel economy, wet grip performance, and abrasion resistance were highly improved while maintaining the balance between them.

The invention claimed is:

1. A pneumatic tire, comprising a base tread formed from a rubber composition, wherein the rubber composition comprises a rubber component comprising:
60 mass % or more of an isoprene rubber based on 100 mass % of the rubber component;
25 to 45 parts by mass of carbon black,
wherein
the carbon black has a CTAB of 140 to 180 m$^2$/g, and the carbon black has a COAN of 110 to 150 ml/100 g; and
1 to 15 parts by mass of a hydrogenated terpene resin having a softening point of 120 to 130° C.,
wherein the tire exhibits a tire heat build-up property index of 97 to 120, or a tire life property index of 98 to 120, or a tire wet property index of 110 to 115.

2. The pneumatic tire according to claim 1, wherein the rubber component comprises 15 mass % or more of a polybutadiene rubber having a cis content of 95 mass % or more.

3. The pneumatic tire according to claim 1, wherein the rubber composition comprises 5 to 30 parts by mass of a silica having a nitrogen adsorption specific surface area of 100 to 200 m$^2$/g per 100 parts by mass of the rubber component.

* * * * *